United States Patent [19]
Takemura et al.

[11] Patent Number: 5,735,769
[45] Date of Patent: Apr. 7, 1998

[54] TOROIDAL TYPE CONTINUOUSLY VARIABLE TRANSMISSION PARTS HAVING INCREASED LIFE

[75] Inventors: Hiromichi Takemura; Hideki Kokubu, both of Kanagawa, Japan

[73] Assignee: NSK Ltd., Tokyo, Japan

[21] Appl. No.: 423,854

[22] Filed: Apr. 18, 1995

[30] Foreign Application Priority Data

Apr. 18, 1994 [JP] Japan .................. 6-078833

[51] Int. Cl.$^6$ .................. F16H 15/38; F16C 33/00
[52] U.S. Cl. .................. 476/40; 148/319; 384/625; 476/73
[58] Field of Search .................. 476/40, 72, 73; 384/625, 492, 907.1; 148/318, 319, 906, 226

[56] References Cited

U.S. PATENT DOCUMENTS

| | | | |
|---|---|---|---|
| 4,004,952 | 1/1977 | Jatczak et al. | 148/319 |
| 4,191,599 | 3/1980 | Stickels et al. | 148/16.5 |
| 4,415,378 | 11/1983 | McKinney et al. | 148/12.1 |
| 4,687,556 | 8/1987 | Sutton et al. | 148/518 X |
| 4,930,909 | 6/1990 | Murakami et al. | 384/492 |
| 5,085,713 | 2/1992 | Morishita et al. | 148/319 X |
| 5,122,000 | 6/1992 | Matsumoto et al. | 384/492 |
| 5,152,851 | 10/1992 | Tamamoto et al. | 148/333 |
| 5,259,886 | 11/1993 | Utsumi et al. | 148/318 |
| 5,268,040 | 12/1993 | Naito et al. | 148/226 X |
| 5,292,200 | 3/1994 | Matsumoto et al. | 384/492 |
| 5,336,338 | 8/1994 | Toda | 148/319 |
| 5,361,648 | 11/1994 | Murakami et al. | 74/569 |
| 5,477,976 | 12/1995 | Suzuki et al. | 148/226 X |
| 5,556,348 | 9/1996 | Kokubu et al. | 476/40 |

FOREIGN PATENT DOCUMENTS

| | | | |
|---|---|---|---|
| 63-203955 | 8/1988 | Japan . | |
| 1-299358 | 12/1989 | Japan | 476/40 |
| 2-49411 | 12/1990 | Japan . | |
| 3-199716 | 8/1991 | Japan | 384/492 |
| 5-195070 | 8/1993 | Japan . | |

OTHER PUBLICATIONS

*Fatigue Life Analysis for Traction Drives with Application to a Toroidal Type Geometry*; John J. Coy et al; NASA Technical Note; NASA TN D–8362; Dec. 1976; p. 16.

*Primary Examiner*—Charles A. Marmor
*Assistant Examiner*—Troy Grabow
*Attorney, Agent, or Firm*—Sughrue, Mion, Zinn, Macpeak & Seas, PLLC

[57] ABSTRACT

A toroidal type continuously variable transmission includes an input disk mounted on an input shaft; an output disk mounted on an output shaft; and a pair of power roller bearings each of which includes an inner race, an outer race, and a plurality of rolling elements. The inner races are engaged with the input and output disks to transmit the power of the input shaft to the output shaft. The inner races, outer races, input disk and output disk are made of case hardening steel, and are each subjected to a heat treatment in which carburizing or carbonitriding, hardening and tempering are performed sequentially, and then to shot peening, and finished by grinding of a predetermined grinding portion.

2 Claims, 4 Drawing Sheets

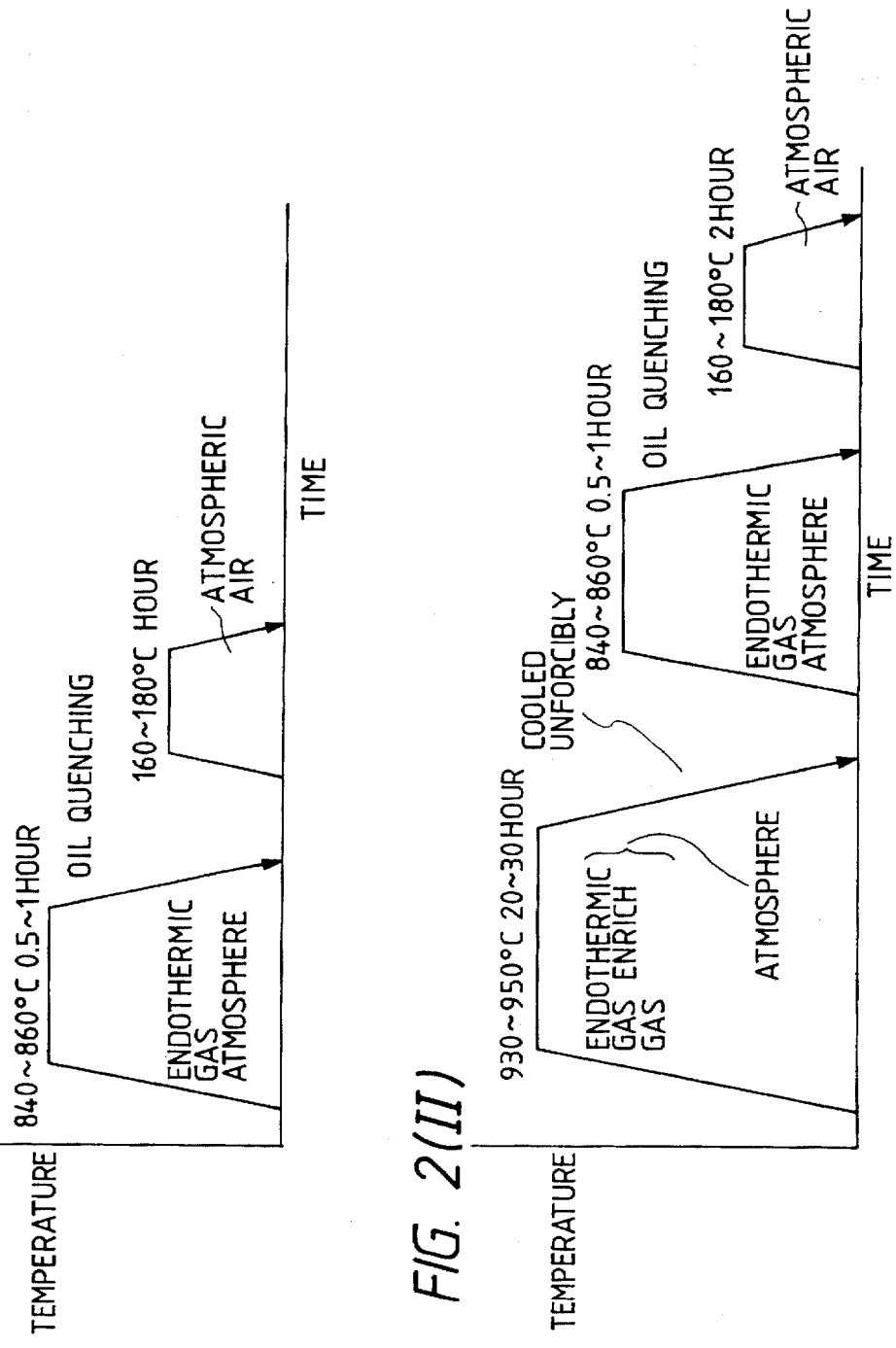

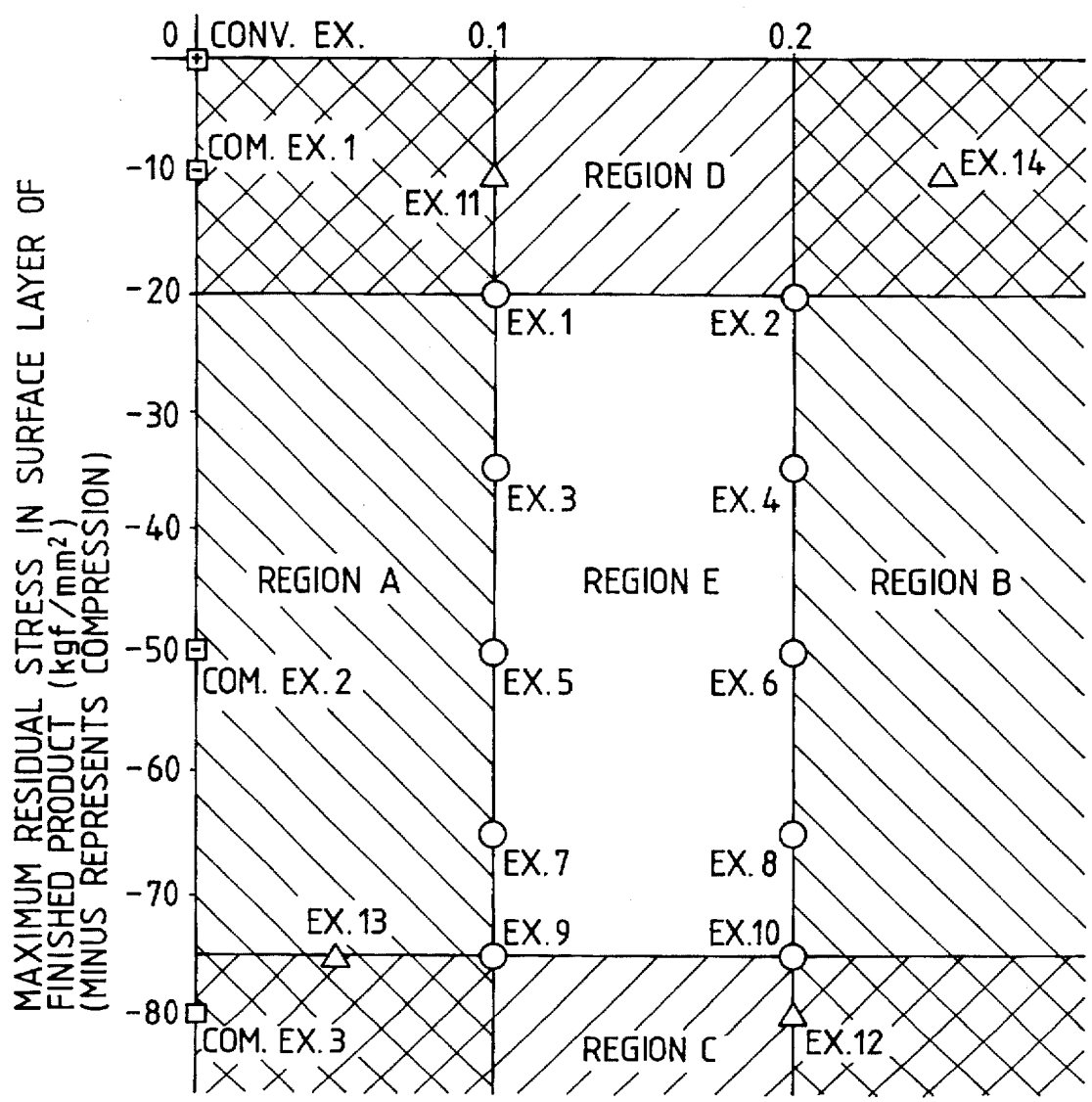

TOROIDAL TYPE CONTINUOUSLY VARIABLE TRANSMISSION PARTS HAVING INCREASED LIFE

BACKGROUND OF THE INVENTION

The present invention relates to toroidal type continuously variable transmissions, and more particularly to an improvement of a toroidal type continuously variable transmission applied to a vehicle such as an automobile.

A conventional toroidal type continuously variable transmission, as shown in FIG. 1, has an input disk 11 and an output disk 12 in a housing (not shown) which are coaxially arranged and confronted with each other.

The toroidal type continuously variable transmission has an input shaft 13 which is inserted along the central axis of a toroidal speed changer section having the input and output disks 11 and 12. A loading cam 14 is mounted on one end portion of the input shaft 13 so as to transmit the motive power (or torque) of the input shaft 12 through a cam roller 15 to the input disk 11.

The input disk 11 and the output disk 12 are substantially equal in configuration to each other, and are arranged in a symmetric manner. The surfaces of disks 11 and 12 which are confronted with each other, form, in combination, a toroidal surface which is substantially semi-circular in axial section. The toroidal surface of the input disk 11 and the toroidal surface of the output disk 12 define a toroidal cavity. A pair of operation transmitting power roller bearings 16 and 17 are arranged in the toroidal cavity in such a manner that they are in contact with the input disk 11 and the output disk 12.

The power roller bearing 16 comprises: a power roller 16a (corresponding to an inner race) which rolls on the toroidal surfaces of the input disk 11 and the output disk 12; an outer race 16b; and a plurality of rolling elements (steel balls) 16c. Similarly, the power roller bearing 17 comprises: a power roller 17a (corresponding to an inner race) which rolls on the toroidal surfaces of the input disk 11 and the output disk 12; an outer race 17b; and a plurality of rolling elements (steel balls) 17c.

That is, the power roller 16a serves as the inner race which is one of the components of the power roller bearing 16, and the power roller 17a also serves as the inner race which is one of the components of the power roller bearing 17.

The power roller 16a is rotatably coupled to a trunnion 20 through a shaft 18, the outer race 16b and the rolling elements 16c, and is tiltably supported with the center of a pivot shaft O which is at the center of the toroidal surface of the input disk 11 and the output disk 12.

The power roller 17a is rotatably coupled to a trunnion 21 through a shaft 19, the outer race 17b and the rolling elements 17c, and is tiltably supported with the center of a pivot shaft O which is at the center of the toroidal surface of the input disk 11 and the output disk 12.

Lubricant with a high viscosity is supplied to the contact surfaces of the input and output disks 11 and 12 and the power rollers 16a and 17a, so that motive power applied to the input disk 11 is transmitted through the lubricant film and the power rollers 16a and 17a to the output disk 12.

The input disk 11 and the output disk 12 are mounted through needle bearings 25 on the input shaft 13 so that those disks 11 and 12 are independent of the input shaft 13 (that is, the input disk 11 and the output disk 12 are not directly affected by the motive power of the input shaft 13).

The output disk 12 is provided with an output shaft 24 which extends parallel to the input shaft 13 and is rotatably supported through angular bearings 22 on the housing (not shown).

In the toroidal type continuously variable transmission 10, power of the input shaft 13 is transmitted to the loading cam 14, so that the latter 14 is turned. The torque of the loading cam 14 is transmitted through the cam roller 15 to the input disk 11, so that the latter 11 is turned. Furthermore, the torque produced by the rotation of the input disk 11 is transmitted through the power rollers 16a and 17a to the output disk 12. As a result, the output disk 12 is rotated together with the output shaft 24.

In order to change the speed, the trunnions 20 and 21 are slightly moved towards the pivot shafts O.

That is, as the trunnions 20 and 21 are axially moved in the above-described manner, the rotating axis of the power rollers 16a and 17a and the axis of the input disk 11 and the output disk 12 are slightly shifted with respect to each other. As a result, the balance of the peripheral speed of rotation of the power rollers 16a and 17a and the peripheral speed of rotation of the input disk 11 is lost, and a component of the torque of the input disk 11 causes the power rollers 16a and 17a to tilt about the pivot shafts O.

Thus, the power rollers 16a and 17a are rotated on the curved surfaces of the input disk 11 and the output disk 12 while being tilted. As a result, the speed ratio is changed, resulting in deceleration or acceleration.

The above-described toroidal type continuously variable transmission having the power roller bearings has been disclosed, for instance, by Japanese Patent Unexamined Publication No. Sho. 63-203955 and Japanese Utility Model Examined Publication No. Hei. 2-49411.

In addition, as a material for the input disk, output disk and power roller bearings as described above, AISI52100 (corresponding to JIS SUJ2 high carbon chromium bearing steel) has been described in, for example, the publication "NASA Technical Note NASA TN D-8362".

When the above-described conventional toroidal type continuously variable transmission is driven, high contact stress is produced between the input disk 11 and the power roller bearing 16 (i.e., in the traction surface of the power roller 16a), between the input disk 11 and the power roller bearing 17 (i.e., in the traction surface of the power roller 17a), between the output disk 12 and the power roller bearing 16 (i.e., in the traction surface of the power roller 16a) and between the output disk and the power roller bearing 17 (i.e., in the traction surface of the power roller 17a), so that a high thrust load is applied to the power roller bearings 16 and 17. The contact stress and the thrust load are high loads which are rarely generated by ordinary rolling bearings.

Hence, the traction surfaces of the power rollers 16a and 17a and the bearing surfaces of the power rollers 16a and 17a are liable to be peeled off or damaged. This limits the service lives of the power roller bearings 16 and 17.

A serious problem which is peculiar to the toroidal type continuously variable transmission when compared with an ordinary rolling bearing is that bending stress is applied to the power rollers 16a and 17a, the input disk 11 and the output disk 12, thus inducing high tensile stress, and therefore cracks are liable to be formed starting from those members. This difficulty makes it impossible to improve fatigue crack resistance.

The above-described difficulties may be overcome by application of a bearing component manufacturing method disclosed by Japanese Patent Unexamined Publication No. Hei. 5-195070. In this method, a bearing component of a predetermined steel material is subjected to a heat treatment including carburizing or carbonitriding and tempering, and then to shot peening. The bearing component thus treated is ground so that a predetermined residual compressive stress is applied to the surface layer of a desired part thereof.

According to the bearing component manufacturing method, the residual compressive stress applied to the surface layer of the desired part resists the high tensile stress which is induced by the bending stress. Hence, it may be considered at least in view of material mechanics that the aforementioned members, namely, the power rollers 16a and 17a, the input disk 11 and the output disk 12 may be improved in fatigue crack resistance characteristic. On the other hand, so-called "micro-cracks" may be formed in the surface layer (particularly near the surface) of the bearing member subjected to shot peening (as described later). The micro-cracks may be developed by repetitive stress applied around them. Hence, when the member is finished merely by grinding, the micro-cracks may not be removed. On the other hand, when the micro-cracks are removed, the surface layer also to which the residual compressive stress has been provided by shot peening may be removed. Hence, even if the aforementioned bearing component manufacturing method is applied to the members of the toroidal type continuously variable transmission, those members are not improved in fatigue crack resistance characteristic to the extent expected.

SUMMARY OF THE INVENTION

Accordingly, an object of the present invention is to eliminate the above-described difficulties accompanying a conventional toroidal type continuously variable transmission. More specifically, an object of the present invention is to provide a toroidal type continuously variable transmission in which the power rollers (or inner races), the outer races, the input disk and the output disk are prevented from being cracked or damaged, and the power roller bearings are long in service life and high in reliability by being resistant to fatigue cracking.

The foregoing object of the present invention has been achieved by the provision of a toroidal type continuously variable transmission comprising: an input disk mounted on an input shaft; an output disk mounted on an output shaft; and a pair of power roller bearings each of which includes an inner race, and outer race, and a plurality of rolling elements, the inner races being engaged with the input and output disks to transmit the power of the input shaft to the output shaft, in which the inner races, outer races, input disk and output disk are made of case hardened steel, and are each subjected to a heat treatment in which carburizing or carbonitriding, hardening and tempering are performed sequentially, and then to a residual stress imparting treatment such as shot peening or barrel polishing to impart compressive residual stress to a desired depth, and are finished by grinding of a predetermined grinding portion.

BRIEF DESCRIPTION OF THE DRAWINGS

FIG. 2(I) is a diagram showing a first heat treatment (I) applied to components of a conventional toroidal type continuously variable transmission, FIG. 2(II) is a diagram showing a second heat treatment (II) applied to the components of the toroidal type continuously variable transmission according to the invention, FIG. 4 is an explanatory diagram for a description of the relationship between maximum residual compressive stresses and grinding depths which are required for the aforementioned components forming the toroidal type continuously variable transmission of the invention.

DETAILED DESCRIPTION OF THE PREFERRED EMBODIMENT

Figure 1:
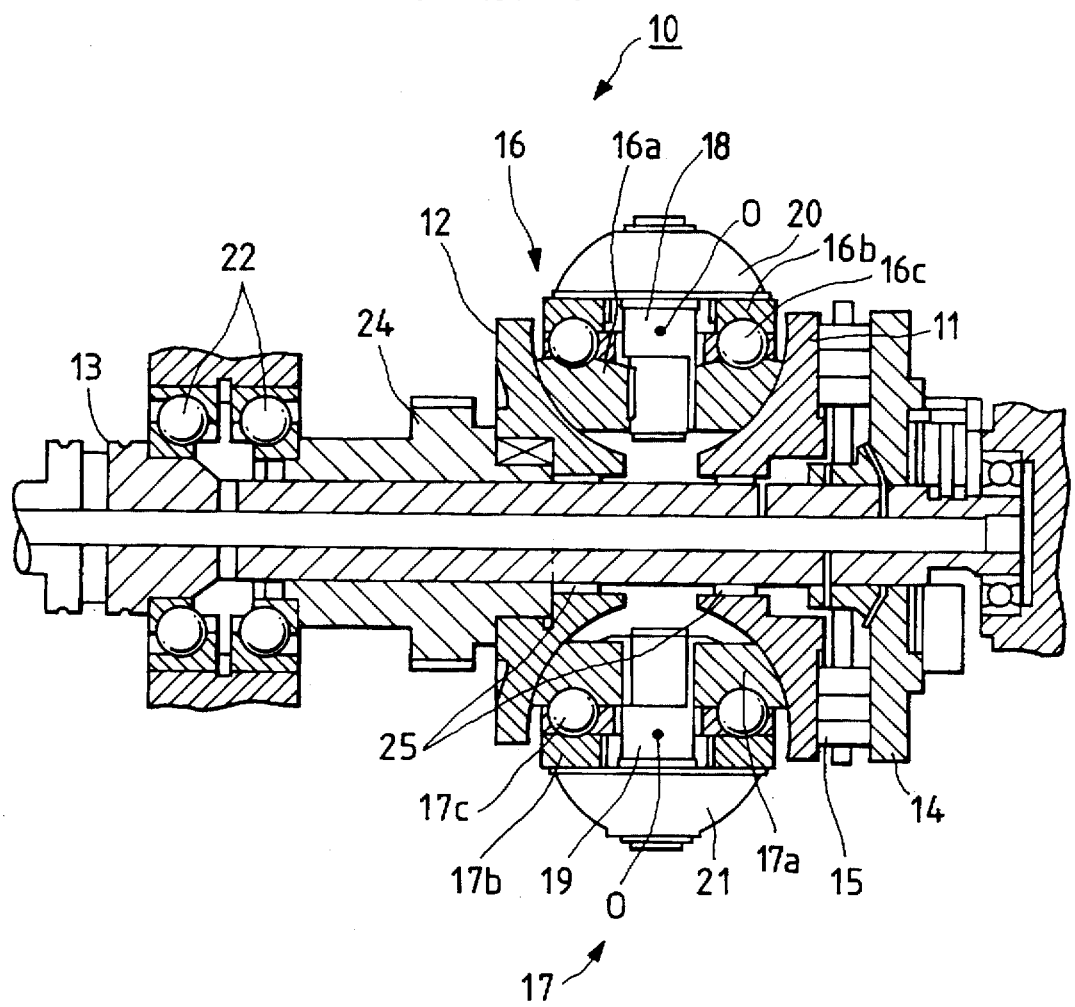
FIG. 1 is a sectional view showing the arrangement of a toroidal type continuously variable transmission.
Figure 3A:
FIG. 3(a) is a diagram outlining a power roller which is a component of the toroidal type continuously variable transmission according to the invention.
Figure 3B:
FIG. 3(b) is a diagram outlining an outer race which is a component of the toroidal type continuously variable transmission according to the invention.
Figure 3C:
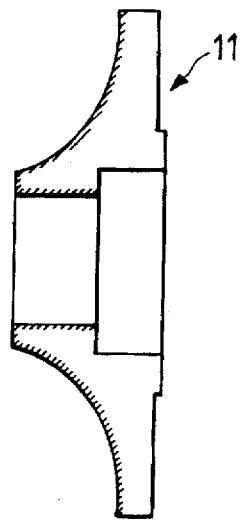
FIG. 3(c) is a diagram outlining an input disk which is a component of the toroidal type continuously variable transmission according to the invention.
Figure 3D:
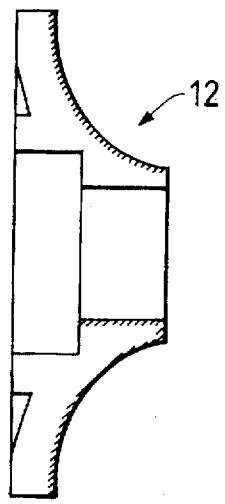
FIG. 3(d) is a diagram outlining an output disk which is a component of the toroidal type continuously variable transmission according to the invention.

The arrangement of a toroidal type continuously variable transmission according to the present invention is similar to that of the above-described toroidal type continuously variable transmission shown in FIG. 1.

In the toroidal type continuously variable transmission of the present invention, the predetermined components of each of the power roller bearings, namely, the inner race (or the power roller) and the outer race, and the input disk and the output disk are made of case hardening steel, and are subjected to a predetermined heat treatment, and to shot peening, and finished by grinding of a predetermined grinding portion. Hence, those members thus treated are free from flaking and damage and from fatigue cracking.

The reasons for this will be described below.

When the members, namely, the power roller (the inner race), the outer race, the input disk and the output disk are subjected to the predetermined heat treatment, and then to shot peening, the surface portion of the material forming each of those members thus treated (hereinafter referred to as "a surface layer", when applicable) is plastically deformed, so that residual compressive stress is produced therein to resist the high tensile stress applied to the member, whereby the member is improved in anti-fatigue lifetime. In addition, the member is improved in fatigue crack lifetime, because fatigue cracking starts from the surface of the member. Furthermore, even when micro-cracks are formed, their development is delayed, so that the fatigue crack lifetime is increased.

However, the plastically deformed portion is found locally fatigued when put under the microscope, and sometimes micro-cracks of 5 to 10 μm are formed in the surface layer. Hence, when high load is applied to the above-described power roller (or inner race), outer race, input disk, and output disk, cracking or flaking is liable to occur starting from the micro-cracks. On the other hand, shot peening makes the surface of the material rough, and stress concentrates on the rough surface so that portions may be broken from the surfaces.

In the invention, the power rollers (or the inner races), the outer races, the input disk and the output disk are subjected to shot peening, and finished by grinding of the predetermined grinding portion, so that residual compressive stress is induced. In addition, the micro-cracks are removed. Hence, the power rollers, the outer races, the input disk and the output disk are markedly improved in anti-fatigue-crack lifetime, and are free from cracking and flaking. That is, they are greatly improved in service life.

On the other hand, the service life of each of those members can be increased with respect to the anti-fatigue-crack characteristic by suitably determining the combination of the grinding portion (the grinding depth from the surface) which is provided after the shot peening operation and the maximum residual stress of the surface layer of the shot-peened part of the member which has been finished by grinding (hereinafter referred to merely as "a grinding depth vs. residual stress characteristic", when applicable).

FIG. 4 indicates the grinding depth vs. residual stress characteristic. Concretely stated, the rolling lifetime and the fatigue crack lifetime can be improved by using the grinding depth and the residual stress which are in the region E (not shaded) inclusive of the border line in FIG. 4.

The reasons for this feature will be described below.

When each of those members, namely, the power roller (or the inner race), the outer race, the input disk and the output disk is finished by grinding with a depth of 0.1 to 0.2 mm from its surface as a predetermined grinding portion, more suitable residual compressive stress is provided in those members. In addition, the micro-cracks formed in those members are effectively removed. As a result, the members are further improved in rolling fatigue lifetime and in anti-fatigue-crack characteristics, and are effectively prevented from cracking and flaking.

If, in the above-described grinding operation, the grinding depth is smaller than 0.1 mm, then all the micro-cracks may not be removed, and accordingly it may be impossible to sufficiently improve the anti-fatigue-crack characteristics (corresponding to the region A in FIG. 4).

On the other hand, performing the grinding operation to a depth of more than 0.2 mm is meaningless and not economical, because no micro-cracks are formed in the part which is located beyond 0.2 mm from the surface. In addition, in this case, the part where residual compressive stress has been developed by shot peening is also removed. Hence, the residual compressive stress scarcely remains, and the anti-fatigue characteristic may be decreased (corresponding to the region B in FIG. 4).

Accordingly, it is preferable that each of the members, namely, the power roller (the inner race), the outer race, the input disk and the output disk is finished by grinding to a depth of 0.1 mm to 0.2 mm from the surface.

Further, each of those members is more effectively and markedly improved in anti-fatigue characteristic and in anti-fatigue-crack characteristics by developing a maximum residual stress of −20 to −75 Kgf/mm$^2$ in the surface layer.

In the invention, the term "negative residual stress" as used herein is referred to as "residual compressive pressure". Hence, the larger the absolute value of the negative residual stress, the larger the residual compressive pressure; and the smaller the absolute value of the negative residual stress, the smaller the residual compressive pressure.

If the maximum residual stress in the surface layer of each of the members, namely, the power roller (the inner race), the outer race, the input disk and the output disk is smaller than −75 Kgf/mm$^2$ (in practice, the residual compressive stress exceeds −75 Kgf/mm$^2$), then the time required for the shot peening operation is increased, which lowers the productivity and increases the manufacturing cost. In addition, the high residual compressive stress region formed in the surface layer is increased in depth, and accordingly the region where micro-cracks are formed is increased in depth accordingly. Hence, the above-descried grinding depth is not large enough, and the micro-cracks are left in the surface layer, which may decrease the fatigue crack lifetime (corresponding to the region C in FIG. 4).

If, on the other hand, the maximum residual stress in the surface layer of each of the members, namely, the power roller (the inner race), the outer race, the input disk and the output disk exceeds −20 Kgf/mm$^2$ (in practice, the residual compressive stress is less than −20 Kgf/mm$^2$), then the anti-rolling-fatigue characteristic and the anti-fatigue-crack characteristic are not sufficiently improved (corresponding to the region D in FIG. 4).

Accordingly, it is preferable that the power roller (the inner race), the outer race, the input disk and the output disk have a maximum residual stress of −20 to −75 Kgf/mm$^2$ in their surface layers.

Next, examples of the present invention, comparison examples and conventional examples will be described.

FIG. 3 is a diagram outlining essential components of the above-described toroidal type continuously variable transmission (shown in FIG. 1). More specifically, FIG. 3(a) shows the power rollers 16a and 17a; FIG. 3(b) shows the outer races 16b and 17b; FIG. 3(c) shows the input disk 11; and FIG. 3(d) shows the output disk 12.

The arrangement of the toroidal type continuously variable transmission according to the present invention is similar to that of the above-described toroidal type continuously variable transmission (shown in FIG. 1). Thus, the description of the components will be omitted.

For the conventional example, SUJ2 (high carbon chromium bearing steel) was used; and for the concrete examples of the present invention and the comparison examples, SCM420 (case hardening steel) was used. The components of the steels are shown in Table 1. Those members shown in FIG. 3 which were formed of the above-described steels were subjected to heat treatments—a first heat treatment (I) shown in FIG. 2(I) (for the conventional example) and a second heat treatment (II) shown in FIG. 2(II) (for the concrete examples and the comparison examples). Thereafter, when necessary, the parts of the members which are shown shaded in the parts FIG. 3(a) through FIG. 3(d) were subjected to shot peening, and finished by grinding of a predetermined grinding portion (to a predetermined grinding depth) (in practice, super finishing after polishing). Thus, power rollers, outer races, input disks and output disks were manufactured which were equal in general configuration to those of the toroidal type continuously variable transmission shown in FIG. 1.

TABLE 1

| Component | SUJ2 | SCM420 |
|---|---|---|
| C | 1.00% | 0.20% |
| Si | 0.25% | 0.20% |
| Mn | 0.40% | 0.70% |
| P | 0.016% | 0.013% |
| S | 0.008% | 0.009% |
| Cr | 1.51% | 1.05% |
| Mo | — | 0.20% |
| O | 8 ppm | 9 ppm |

Heat Treatment (I)

As indicated in FIG. 2(I), each of the members was heated (directly) for 0.5 to 1 hour in an endothermic gas atmosphere at temperatures of 840° to 860° C., and then subjected to oil quenching (hardening). The member thus processed was heated in an atmospheric air at temperatures of 160° to 180° C. for two hours, and then cooled (tempering).

Heat Treatment (II)

As indicated in FIG. 2(II), each of the members was heated (carburizing) in an endothermic gas and enrich gas atmosphere at temperatures of 930° to 950° C. for twenty to thirty hours, and then cooled unforcibly. Thereafter, the member was heated (directly) in an endothermic gas atmosphere for 0.5 to 1 hour until its temperature reaches 840° to 860° C., and then subjected to oil quenching (hardening). Next, the member thus treated was heated in an atmospheric air at temperatures of 160° to 180° C. for two hours, and then cooled (tempering).

Next, the maximum residual stresses (Kgf/mm$^2$) of the surface layers of the power rollers 1 through 30 formed in the above-described manner were measured. In this case, the profile of the residual stress which was extended in the member inwardly from the surface was obtained, and the maximum value thereof was employed as a measurement value. The results of measurement are as indicated in the following Table 2.

In Table 2, as for the residual stresses (Kgf/mm$^2$), negative (−) residual stresses are residual compressive stresses, and positive (+) residual stresses are residual tensile stresses in addition, in Table 2, shot peening is abbreviated to "SP", and grinding portions for grinding finish are represented by grinding depths (mm).

TABLE 2

| | Power roller SP. given or not given | Grinding depth (mm) | Outer race Residual stress (Kgf/mm²) | Input disc SP. given or not given | Grinding depth (mm) | Output disc Residual stress (Kgf/mm²) | Fatigue crack life time (hr.) and damaged parts |
|---|---|---|---|---|---|---|---|
| Ex. 1 | Given | 0.1 | −20 | Given | 0.1 | −20 | 100 or more |
| Ex. 2 | Given | 0.2 | −20 | Given | 0.2 | −20 | 100 or more |
| Ex. 3 | Given | 0.1 | −35 | Given | 0.1 | −35 | 100 or more |
| Ex. 4 | Given | 0.2 | −35 | Given | 0.2 | −35 | 100 or more |
| Ex. 5 | Given | 0.1 | −50 | Given | 0.1 | −50 | 100 or more |
| Ex. 6 | Given | 0.2 | −50 | Given | 0.2 | −50 | 100 or more |
| Ex. 7 | Given | 0.1 | −65 | Given | 0.1 | −65 | 100 or more |
| Ex. 8 | Given | 0.2 | −65 | Given | 0.2 | −65 | 100 or more |
| Ex. 9 | Given | 0.1 | −75 | Given | 0.1 | −75 | 100 or more |
| Ex. 10 | Given | 0.2 | −75 | Given | 0.2 | −75 | 100 or more |
| Ex. 11 | Given | 0.15 | −50 | Given | 0.1 | −10 | 42, Disk |
| Ex. 12 | Given | 0.15 | −50 | Given | 0.2 | −80 | 62, Disc |
| Ex. 13 | Given | 0.15 | −50 | Given | 0.05 | −75 | 40, Disc |
| Ex. 14 | Given | 0.15 | −50 | Given | 0.25 | −10 | 36, Disc |
| Com. Ex. 1 | Given | 0.15 | −50 | Given | Not ground | −10 | 11, Disc |
| Com. Ex. 2 | Given | 0.15 | −50 | Given | Not ground | −50 | 18, Disc |
| Com. Ex. 3 | Given | 0.15 | −50 | Given | Not ground | −80 | 27, Disc |
| Com. Ex. 4 | Given | 0.15 | −50 | Not given | — | — | 8, Disc |
| Conv. Ex. 1 | Not given | — | — | Not given | — | — | 3, Power roller (Disc) |

The power rollers, the outer races, the input disks and the output disks listed in Table 2 were used to form toroidal type continuously variable transmissions as shown in FIG. 1 as Examples 1 through 14 of the present invention, Comparison Examples 1 through 4, and Conventional Example 1. The above-described rolling elements (or steel balls) were formed as follows: Balls made of SUJ2 indicated in Table 1 were subjected to hardening and tempering, and then finished by grinding.

The services lives of Examples 1 through 14, Comparison Examples 1 through 4 and Conventional Example 1 thus formed were investigated under the following conditions:

[Conditions of Inventigation]

| Input shaft speed | 4000 rpm |
|---|---|
| Input torque | 392 N · m |
| Oil | Synthetic lubricant |
| Oil temperature | 100° C. |

The service life of each of the specimens (Examples 1 through 14, Comparison Examples 1 through 4, and Conventional Example 1) was determined as follows: That is, the period of time which elapses until flaking occurs with any one of the members, namely, the power roller, outer race, input disk and output disk in the specimen, or the period of time which elapses until fatigue cracks occur with any one of the members, was employed as the service life. In the case when, during the measurement, the rolling elements (or balls) were, for example, damaged, they were replaced with new ones, to continue the test. The measurement was carried out for 100 hours. The results of measurement are as indicated in Table 2 (in which term "hours" is abbreviated "hr").

As is apparent from Table 2 that Examples 1 through 14 are improved in service life when compared with Comparison Examples 1 through 4 and Conventional Example 1. This demonstrates that Examples 1 through 14 (according to the invention) were increased in service life in each of which the power roller (or inner race), the outer race, the input disk and the output disk were made of case hardening steel, and subjected to the predetermined heat treatment including carburizing, hardening and tempering and then to shot peening, and finished by grinding of a predetermined grinding portion (to a predetermined grinding depth).

Especially in Examples 1 through 10, when compared with Examples 11 through 14, no flaking nor damage occurred with any one of the members, namely, the power roller, outer race, input disk and output disk for 100 hours or longer; and in addition no fatigue cracking occurred with any one of the members for 100 hours or longer. This means that they were markedly improved in service life.

This is due to the following facts: In each of Examples 1 through 10, the four members, namely, the power roller, the outer race, the input disk and the output disk were made of case hardening steel, and they were subjected to the heat treatment including carburizing, hardening and tempering, and then to shot peening, and finished by grinding. And each of the members was ground to a depth of from 0.1 mm to 0.2 mm, and the maximum residual stress of the surface layer of the member thus ground was set to −20 to −75 Kgf/mm². As a result, residual compressive stress most suitable for improvement of service life was formed in the power roller, outer race, input disk and output disk of each of Concrete Examples 1 through 10.

In addition, micro-cracks formed in the power roller, outer race, input disk and output disk were effectively removed, which eliminated the difficulty that cracking or flaking occurs with those members starting from the micro-cracks.

On the other hand, in Conventional Example 1, the members were made of SUJ2, and were not subjected to shot peening nor to grinding. Hence, fatigue cracking occurred in the power roller in only three hours. This tendency also existed with the input disk and the output disk.

In Comparison Examples 1 through 3, the input disk and the output disk were subjected to shot peening, but they were not finished by grinding. Hence, in Comparison Examples 1 to 3, when compared with Examples 1 through 14, fatigue cracking occurred in the input disk and the output disk in a short time. Especially in Comparison Example 1, the maximum residual compressive stress of the surface layer was lower than −20 Kgf/mm², and therefore the service life was short.

In Comparison Example 4, the input disk and the output disk were not subjected to shot peening, and not finished by grinding. Therefore, fatigue cracking occurred with them in a short time, eight hours, which was substantially equal to that in the case of Conventional Example 1.

In Examples 11 through 14, the members were subjected to shot peening, and finished by grinding. Hence, Examples 11 through 14 were longer in service life than Comparison Examples 1 through 3 and Conventional Example 1. However, Examples 11 and 12 were shorter in fatigue crack lifetime than Examples 1 through 10, because in Example 11, the maximum residual compressive stress was lower than −20 Kgf/mm², and in Concrete Example 12, it was over −75 Kgf/mm². In addition, Examples 13 and 14 were shorter in lifetime than Examples 1 through 10, because in Example in 13, the grinding depth was not sufficient, and therefore all the micro-cracks were not removed from the surface layer, and in Example 14, the grinding depth was too large, and therefore the maximum residual compressive stress was small. However, it can be said that Examples 11 through 14 were sufficiently long in service life when used normally.

In the case where the input disk and the output disk were equivalent to the power rollers and the outer races in Examples 11 through 14 and Comparison Examples 1 through 4, and the power roller and the outer race were equivalent to the input disks and the output disks in Examples 11 through 14 and Comparison Examples 1 through 4 (the data being not indicated), its tendency was the same as those in Examples 11 through 14 and Comparison Examples 1 through 4 (fatigue cracking occurred with the power roller).

Thus, it has been determined from the above-described results that, in order to increase the service life, it is preferable that the power roller (the inner race), the outer race, the input disk and the output disk are made of case hardening steel and are subjected to the predetermined heat treatment including carburizing, hardening and tempering and then to shot peening, and finished by grinding of the predetermined grinding portion in such a manner that the surface is ground to a depth of 0.1 to 0.2 mm, and in those members thus finished, the surface layer is −20 to −75 Kgf/mm² in maximum residual stress. FIG. 4 is a diagram obtained by plotting the data of Examples 1 through 14, Comparison Examples 1 through 4, and Conventional Example 1. As is seen from FIG. 4, Examples 1 through 10 are in the above-described region E.

In the above-described Examples, the employed case hardening steel was SCM420; however, the invention is not limited thereto or thereby. That is, it goes without saying that the technical concept of the invention is applicable to other case hardening steels such as SCr420 and SNCM220 which have different components from SCM420.

In the heat treatment, carbonitriding may be employed instead of carburizing. In this case, the heat treatment is carried out in the atmosphere which is obtained by adding ammonia gas to the atmosphere of endothermic gas and enrich gas shown in FIG. 2(II), and other conditions may be the same as those in FIG. 2(II).

As was described above, in the toroidal type continuously variable transmission of the invention, the above-described members forming each of the power roller bearings to which extremely high load is applied, namely, the inner race (or the power roller) and the outer race, and the input disk and the output disk are made of case steel, and subjected to the predetermined heat treatment including carburizing or carbonitriding, hardening and tempering, and to shot peening, and then finished by grinding of the predetermined grinding portion. Hence, the power roller (the inner race), the outer race, the input disk and the output disk are prevented from flaking and damage. In addition, the occurrence of cracks in the bearing inside diameter surface or traction surface is prevented which is a drawback intrinsic in a conventional toroidal type continuously variable transmission. Thus, the toroidal type continuously variable transmission of the invention is considerably long in service life.

What is claimed is:

1. A toroidal type continuously variable transmission comprising:

an input disk mounted on an input shaft;

an output disk mounted on an output shaft; and a pair of power roller bearings each including-an inner race, an outer race, and a plurality of rolling elements, said inner race being engaged with said input and output disks to transmit motive power of said input shaft to said output shaft, characterized in that at least one of said inner race, outer race, input disk and output disk are made of case hardening steel, has a surface layer subjected to a heat treatment in which carburizing or carbonitriding, hardening and tempering are performed sequentially, and then to shot peening treatment to impart compressive residual stress, and after the shot peening treatment, grinding finishing is performed to remove a grinding portion of a region having a depth of 0.1 to 0.2 mm from the surface of each of said at least one of said inner race, outer race, input disk and output disk so that the remaining surface layer has a compressive residual stress within a range of $-20$ to $-75$ Kgf/mm$^2$.

2. A toroidal type continuously variable transmission as claimed in claim 1, wherein said surface layer is a surface including a rolling surface against a mating member.

* * * * *